United States Patent [19]

Yoshino

[11] Patent Number: 4,791,044
[45] Date of Patent: Dec. 13, 1988

[54] DISK TYPE INFORMATION RECORDING MEDIUM

[75] Inventor: Toshikazu Yoshino, Tokorozawa, Japan

[73] Assignee: Pioneer Electronic Corporation, Tokyo, Japan

[21] Appl. No.: 97,324

[22] Filed: Sep. 11, 1987

Related U.S. Application Data

[63] Continuation of Ser. No. 824,130, Jan. 30, 1986, abandoned.

[30] Foreign Application Priority Data

Jan. 30, 1985 [JP] Japan .................. 60-011997[U]

[51] Int. Cl.⁴ .................................... G01D 15/14
[52] U.S. Cl. ........................ 430/270; 430/945;
428/65; 346/135.1; 346/137; 369/284; 369/286; 369/288
[58] Field of Search ........ 369/284, 286, 288; 346/135.1, 137; 430/945, 270; 428/64, 65

[56] References Cited

U.S. PATENT DOCUMENTS 4,600,625 7/1986 Abe et al. .................. 430/945 X

FOREIGN PATENT DOCUMENTS 8201556 11/1982 Netherlands .................. 369/284
2087129 5/1982 United Kingdom .......... 369/284

Primary Examiner—Alexander S. Thomas
Attorney, Agent, or Firm—Foley & Lardner Schwartz, Jeffery Schwaab, Mack, Blumenthal & Evans

[57] ABSTRACT

A disk-shaped information recording medium is provided in such a manner that at least one information bearing layer formed on a side of a pair of disk-shaped substrates, which substrates are arranged so that the information bearing layers face each other with a hollow space between them by means of inner and outer spacers being concentrically interposed between the two substrates. A polyurethane adhesive layer is formed between the substrate and the spacer to combine said pair of substrates together via the inner and outer spacers.

7 Claims, 1 Drawing Sheet

DISK TYPE INFORMATION RECORDING MEDIUM

This application is a continuation of application Ser. No. 824,130, filed Jan. 30, 1986 abandoned.

BACKGROUND OF THE INVENTION

The present invention relates to a disk type information recording medium on which sound and/or video information is recorded by an optical method.

Conventionally, disk type information recording media such as shown in FIG. 2 have been used as recording media for use in systems for processing sound and/or video information.

FIG. 2 is a perspective view of the information recording medium, showing a cross section thereof. The information recording medium shown in FIG. 2 has a single information bearing layer a or two information bearing layers a, on one side or on both sides thereof. An inner spacer d and an outer spacer C are interposed between a pair of substrates b. Adhesive agent such as an epoxy adhesive or an ultraviolet ray setting adhesive is used to combine the inner and outer spacers d and C to the substrates b on both sides. The information recording medium f is formed in this way.

The information recording medium f has a hollow space e between two information bearing layers a on both sides, and a center hole g, at the center thereof, by which the information recording medium is clamped in a disk drive portion of an information processing apparatus.

However, in regard to conventional information recording media such as the medium explained above, there have been drawbacks in that, in the case of the epoxy adhesives, adhesive strength between the substrate b and the inner and outer spacers d, C is very low, although some of them are chemically stable against the material of the recording layer. In the case of the ultraviolet ray setting adhesives, workability in the manufacturing process is good and the adhesive strength is sufficient. However, the drawback is that the recording layer is damaged by gases (unreacted monomers or the like) produced as a result of setting of the adhesive.

SUMMARY OF THE INVENTION

The present invention has been made in the contemplation to eliminate the above described problems of conventional technique, and an object of the present invention is to provide a disk-shaped information recording medium in which the adhesive strength is high enough to prevent the separation under any environmental condition while the recording layer of organic or inorganic material is prevented from being damaged after the setting of the adhesive, and which has enough flexibility for reducing the curving of substrates which may be caused by moisture absorption of the substrates.

According to the present invention, a disk-shaped information recording medium is provided in a manner such that an information bearing layer is formed on one side of each of a pair of disk-shaped substrates, and the substrates are arranged so that the information bearing layers face each other with a hollow space between them. An inner spacer is interposed between the two substrates cocentrically, and an outer spacer is interposed between respective outer peripheral portions of the two substrates. Both sides of the inner and outer spacers are pasted to the substrates by means of a polyurethane adhesive which is obtained by the reaction between an isocyanate and a polyol.

DETAILED DESCRIPTION OF THE INVENTION

An embodiment of the disk-shaped information recording medium according to the present invention will be described with reference to the accompanying drawings.

Figure 1:
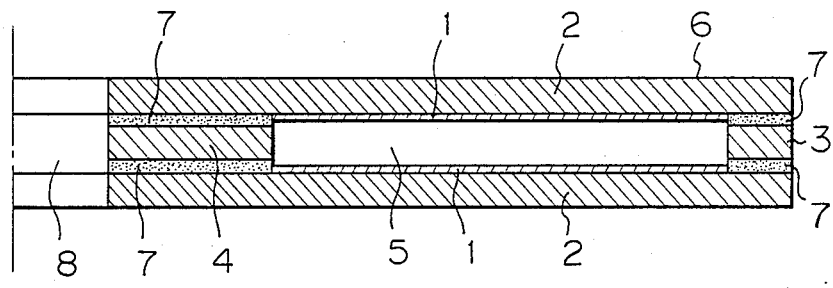
FIG. 1 is a cross-sectional view of an embodiment of the disk-shaped information recording medium according to the present invention.
Figure 2:
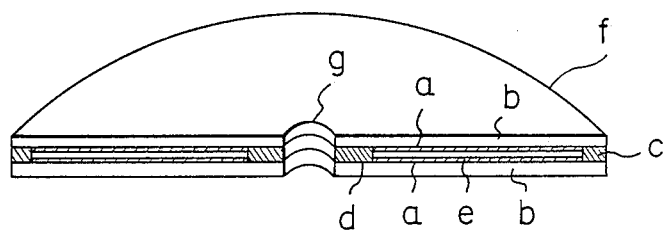
FIG. 2 is a perspective view of a disk-shaped information recording medium of conventional type, showing a cross-section thereof.

FIG. 1 is a sectional view showing the structure of the embodiment. In FIG. 1, a pair of substrates 2 are respectively provided with an information bearing layer 1 on one side thereof. As the material of the information bearing layer 1, an organic coloring matter can be used. In organic coloring matters, for example, a cyanine dye of 2-{7-[1,3-Dihydro-1,1-dimethyl-3-(4-sulfobutyl)benz-(e)indolin-2-ylidene]-1,3,5-heptatrienyl}-1,1-dimethyl-3-(4-sulfobutyl)-1H-benz(e)indolium hydroxide inner salt sodium salt, which is expressed by the following structural fomula is used in this embodiment:

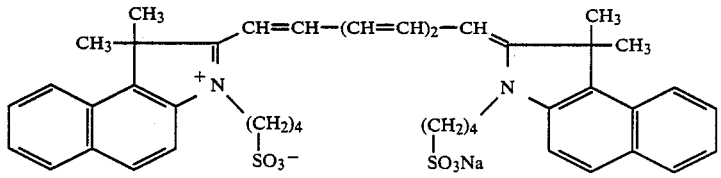

The substrates 2 are disk-like form and made from PMMA (polymethyl methacrylate) for example. The information bearing layers 1 comprise a recording layer or a light reflecting layer, and information carried by this information bearing layer is read out by irradiating, for example, a laser beam converged thereinto.

The pair of information bearing layers 1 are arranged to face each other, and an inner spacer 4 is interposed concentrically between the substrates 2 in a central portion so that a hollow space 5 is formed between the information bearing layers 1. Also, an outer spacer 3 is interposed near to an outer periphery of the pair of the substrates 2. An acrylic resin is used as the material for the inner and outer spacers.

On the top and bottom faces of the inner and outer spacers 4 and 3, there is applied a polyurethane adhesive 7. By this polyurethane adhesive 7, the substrates 2 are pasted to the inner spacer 4 and the outer spacer 3 at its top and bottom faces, thereby the information recording medium 6 is formed.

The polyurethane adhesive 7 is described in "ENCYCLOPEDIA OF ADHESIVES" (upper volume) by Ichirou Shibazaki, from Kabushiki Kaisha Kohbunshi Kankoukai. The general formula of this polyurethane adhesive 7 is as follows:

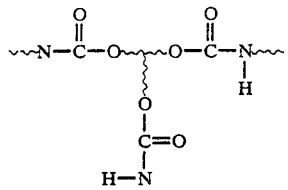

The polyurethane adhesive is produced by a reaction between a modified diisocyanate having OH radical ends which is prepared from a polyester or a polyether and a reactive prepolymer made from a polyhydroxy compound such as a diol or a polyol which have a low molecular weight. It has been found by the inventor that the produced polyurethane adhesive does not damage the recording layer of organic or inorganic material after the setting, and has a sufficient adhesive strength for preventing the separation under any environmental condition. The polyurethane adhesive also has a viscoelastic characteristic for reducing the curving of the substrates owing to moisture absorption.

For the polyol, the castor oil or the polyethyleneglycol [$HO(CH_2CH_2O)_nCH_2CH_2OH$] is an example.

The above mentioned polyurethane adhesive 7 has the following characteristics of:

(1) a viscosity suited for coating only desired portions of the spacers at the room temperature;

(2) a T-type Friction Pull strength higher than 8 kgf/25 mm at any temperature and humidity for securing the information bearing layer; and (3) a proper elasticity provided after the setting while the damage to the information bearing layer is prevented.

The above described embodiment was an example of an air package type information recording medium. However, the present invention is applicable to disks of a type in which the whole surface of the substrates is pasted, since the polyurethane adhesive is not harmful to the information bearing layer.

As will be understood from the foregoing description, in the disk-shaped information recording medium according to the present invention, the polyurethane adhesive is used for bonding the inner and outer spacers to the substrates on both sides of the inner and outer spacers. Therefore, the substrates and the information bearing layer are freed of the problem of being damaged by the adhesive. Further, the deformation of the substrates due to the moisture absorption is reduced by the polyurethane adhesive layer since the polyurethane adhesive layer has sufficient elasticity not only under a normal using environment but also under special environments of high temperature and high humidity.

For this reason, the curving of the information bearing layer is not likely to occur, and accordingly, the thus prepared disk is advantageous for preventing the separation of the polyurethane adhesive at the peripheral portion of the disk. Therefore, the age-induced change is by far reduced as compared with disks using adhesive agents of the other sort.

Furthermore, a vertical free drop test from the height of 90 cm shows that no separation of the substrates occurs with the disk type information recording medium according to the present invention, although the substrates themselves can be broken. Thus, the disk-shaped information recording medium according to the present invention has advantages such that a high form stability is attained while maintaining a low cost of the recording medium, and the strength of the recording medium is high enough.

I claim:

1. A information recording disk medium comprising:
    a pair of disk-shaped substrates disposed in parallel to each other;
    information bearing layers made of a cyanine dye and formed respectively on surfaces of said pair of substrates which face each other, from which information is read by irradiating a light beam such as a laser beam thereon;
    an inner spacer concentrically interposed between said pair of substrates at a central part of said substrates so as to form a hollow space between said information bearing layers facing each other;
    an outer spacer concentrically interposed between said pair of substrates at a peripheral portion thereof; and
    polyurethane adhesive layers having a viscoelastic characteristic and respectively connecting said pair of substrates with said inner and outer spacers.

2. A information recording disk medium as set forth in claim 1 wherein the disk-shaped substrates are made of polymetyl metacrylate.

3. A information recording disk medium as set forth in claim 2 wherein an acrylic resin is used as the material for the inner and outer spacers.

4. A information recording disk medium as set forth in claim 3 wherein each polyurethane adhesive layer made of polyurethane is prepared by a reaction of an isocyanate and a polyol.

5. A information recording disk medium as set forth in claim 4 wherein the polyurethane adhesive has the following general formula:

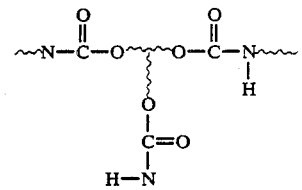

6. A information recording disk medium as set forth in claim 5 wherein the polyol is the castor oil or the polyethylenglycol [$HO(CH_2CH_2O)_nCH_2CH_2OH$].

7. A information recording disk medium as set forth in claim 1 wherein the cyanine dye is 2-{7-[1,3-Dihydro-1,1-dimethyl-3-(4-sulfobutyl)benz(e)indolin-2-ylidene]-1,3,5-heptatrienyl}-1,1-dimetyl-3-(4-sulfobutyl)-1H-benz(e)indolium hydroxide inner salt sodium salt, which is expressed by the following structural formula:

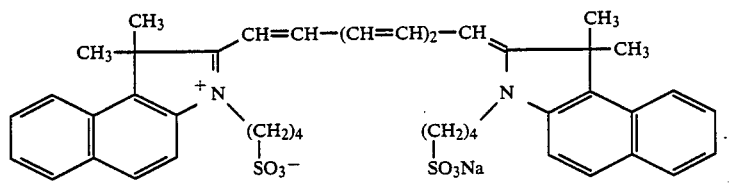
* * * * *